United States Patent
Wang et al.

(10) Patent No.: US 11,186,700 B2
(45) Date of Patent: Nov. 30, 2021

(54) METHOD FOR PREPARATION OF A STABLE POLYMER DISPERSION WITH COLLOIDAL SILICA PARTICLES

(71) Applicant: ROHM and HAAS Company, Philadelphia, PA (US)

(72) Inventors: Yujiang Wang, Shanghai (CN); Jianming Xu, Shanghai (CN); Tao Wang, Highton (AU)

(73) Assignee: Rohm and Haas Company, Philadelphia, PA (US)

( * ) Notice: Subject to any disclaimer, the term of this patent is extended or adjusted under 35 U.S.C. 154(b) by 229 days.

(21) Appl. No.: 16/035,044

(22) Filed: Jul. 13, 2018

(65) Prior Publication Data

US 2018/0319952 A1 Nov. 8, 2018

Related U.S. Application Data

(62) Division of application No. 15/317,138, filed as application No. PCT/CN2014/081639 on Jul. 4, 2014, now Pat. No. 10,040,921.

(51) Int. Cl.

| | |
|---|---|
| C08K 3/36 | (2006.01) |
| C08F 220/14 | (2006.01) |
| C08F 2/26 | (2006.01) |
| C08F 2/44 | (2006.01) |
| C08F 292/00 | (2006.01) |
| C09D 5/00 | (2006.01) |
| C09D 133/02 | (2006.01) |
| C09D 133/10 | (2006.01) |
| C09D 133/12 | (2006.01) |
| C09D 151/10 | (2006.01) |

(52) U.S. Cl.
CPC .......... *C08K 3/36* (2013.01); *C08F 2/26* (2013.01); *C08F 2/44* (2013.01); *C08F 220/14* (2013.01); *C08F 292/00* (2013.01); *C09D 5/00* (2013.01); *C09D 133/02* (2013.01); *C09D 133/10* (2013.01); *C09D 133/12* (2013.01); *C09D 151/10* (2013.01); *C08L 2201/54* (2013.01)

(58) Field of Classification Search
CPC . C08K 3/36; C08F 220/14; C08F 2/26; C08F 2/44; C08F 292/00; C09D 133/12; C09D 5/00; C09D 133/02; C09D 133/10; C09D 151/10; C08L 2201/54
USPC .......................................................... 524/457
See application file for complete search history.

(56) References Cited

U.S. PATENT DOCUMENTS

| | | |
|---|---|---|
| 2,577,484 A | 12/1951 | Rule |
| 2,773,028 A | 12/1956 | Monet |
| 3,969,266 A | 7/1976 | Iler |
| 6,630,530 B1 | 10/2003 | Han |
| 7,985,789 B2 | 7/2011 | Albalat Perez et al. |
| 8,436,088 B2 | 5/2013 | Cabrera et al. |
| 2017/0121495 A1 | 5/2017 | Wang et al. |

FOREIGN PATENT DOCUMENTS

| | | | |
|---|---|---|---|
| JP | 01069673 A | * | 3/1989 |
| JP | H06227945 A | | 8/1994 |
| WO | 0118081 A1 | | 3/2001 |
| WO | 2008040464 A1 | | 4/2008 |
| WO | 2008142383 A1 | | 11/2008 |
| WO | 2013056464 A1 | | 4/2013 |
| WO | 2016000253 A1 | | 1/2016 |

OTHER PUBLICATIONS https://colloidalsilica.nouryon.com/colloidal-silica-facts-chemistry-characteristics/.*
Translation of JP 01069673 A (1989).*
Lee et al.; "Synthesis of polystyrene/silica composite particles by soap-free emulsion polymerization using positively charged colloidal silica"; Journal of Colloid and Interface Science; 310; (2007); pp. 112-120.
Mitzutani et al.; "Application of silica-containing nano-composite emulsion to wall paint: A new environmentally safe paint of high performande"; Progress in Organic Coatings; 55; (2006); pp. 276-283.
Ramos et al.; "Synthesis of poly-(BA-co-MMA) latexes filled with SiO2 for coating in construction applications" Progress in Organic Coatings; vol. 72; Issue 3; (Nov. 2011); pp. 438-442.
Shen et al. "Large-scale fabrication of three-dimensional ordered polymer films with string dtructure colors and robust mechanical properties"; J. Mater. Chem.; 2012; 22; 8069-8075.
You et al.; Preparation and properties of poly[styrene-co-(butyl acrylate)-co-(acrylis acid)]/silica nanocomposite latex prepared using an acidic silica sol; Poly Int (2009); 58; pp. 519-529.

* cited by examiner

*Primary Examiner* — Kelechi C Egwim
(74) *Attorney, Agent, or Firm* — Karl E. Stauss; Cantor Colburn LLP

(57) ABSTRACT

A method of preparing a polymer dispersion comprising (i) contacting an aqueous dispersion of de-ionized acidic colloidal silica particles with a first mixture of monomers to form a combination; (ii) polymerizing such combination at an initial pH of from 2 to 5 to at least 90% in completion; and (iii) adding a second mixture of monomers at a rate substantially equal to the rate of consumption of such second mixture of monomers to continue and complete the polymerization. The present invention further provides a polymer dispersion made from the above method.

14 Claims, No Drawings

METHOD FOR PREPARATION OF A STABLE POLYMER DISPERSION WITH COLLOIDAL SILICA PARTICLES

CROSS REFERENCE TO RELATED APPLICATIONS

This application is a divisional application of U.S. Application Ser. No. 15/317,138, filed on Dec. 8, 2016, which is a U.S. National Stage of PCT International Application No. PCT/CN2014/081639, filed on Jul. 4, 2014, the disclosure of all which is also incorporated herein by reference in its entirety.

FIELD OF THE INVENTION

The present invention relates to a preparation method for a stable polymer dispersion comprising colloidal silica particles.

INTRODUCTION

Colloidal silica particles are ultra fine silicon dioxide particles dispersed in water/solvent. It brings improved dirt pick up resistance (DPUR), hardness, and stain blocking performances to coatings and is widely used in the coating industry. However, polymer dispersions comprising colloidal silica particles, especially in a significant amount, are not stable enough and tend to gel. This makes such polymer dispersions not suitable for long-term storage, and limits the application of colloidal silica in the coating industry.

It is therefore desired in the art for a new method of preparing polymer dispersions comprising colloidal silica particles and the polymer dispersions are stable and suitable for long-term storage.

SUMMARY OF THE INVENTION

The present invention provides a method of preparing a polymer dispersion comprising (i) contacting an aqueous dispersion of de-ionized acidic colloidal silica particles with a first mixture of monomers to form a combination; (ii) polymerizing such combination at an initial pH of from 2 to 5 to at least 90% in completion; and (iii) adding a second mixture of monomers at a rate substantially equal to the rate of consumption of such second mixture of monomers to continue and complete the polymerization.

The present invention further provides a polymer dispersion made from the above method.

DETAILED DESCRIPTION OF THE INVENTION

The method of preparation for the polymer dispersion comprises the steps of (i) contacting an aqueous dispersion of de-ionized acidic colloidal silica particles with a first mixture of monomers to form a combination; (ii) polymerizing said combination at an initial pH of from 2 to 5, and preferably from 2.5 to 4 to at least 90% in completion, preferably at least 95%, and more preferably at least 98% in completion; and (iii) adding a second mixture of monomers at a rate substantially equal to the rate of consumption of said second mixture of monomers to continue and complete the polymerization.

The total amount of the first and the second mixtures of monomers is from 30% to 90%, preferably from 40% to 85%, and more preferably from 50% to 80% by dry weight based on total dry weight of the polymer dispersion. The amount of the first mixture of monomers is from 1% to 30%, preferably from 3% to 20%, and more preferably from 6% to 10% by dry weight based on total dry weight of the first and the second mixtures of monomers.

The polymer dispersion comprises from 10% to 70%, preferably from 15% to 60%, and more preferably from 20% to 50% by dry weight based on total dry weight of the polymer dispersion, the de-ionized acidic colloidal silica.

The First and the Second Mixtures of Monomers

In the present invention, the first and the second mixtures of monomers can be the same or different in both components and concentrations.

The first and the second mixtures of monomers are both polymerizable ethylenically unsaturated nonionic monomer. As used herein, the term "nonionic monomer" means that the polymerizable monomer residue does not bear an ionic charge between pH=1-14. Suitable examples of the polymerizable ethylenically unsaturated nonionic monomers include (meth)acrylic ester monomers, i.e., methacrylic ester or acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, and lauryl methacrylate; (meth)acrylonitrile; styrene and substituted styrene such as α-methyl styrene, and vinyl toluene; butadiene; ethylene; propylene; a-olefin such as 1-decene; vinyl esters such as vinyl acetate, vinyl butyrate, and vinyl versatate; and other vinyl monomers such as vinyl chloride and vinylidene chloride.

At least one of the first and the second mixtures of monomers may further comprise from 0.1% to 10%, and preferably from 0.5% to 5% by dry weight based on total dry weight of the monomers, of an ethylenically unsaturated monomer carrying at least one functional group selected from carboxyl, carboxylic anhydride, hydroxyl, amide, amino, ureido, acetoacetate, sulphonate, phosphonate and any combination thereof. Suitable examples of these monomers are ethylenically unsaturated carboxylic or dicarboxylic acid such as acrylic or methacrylic acid, itaconic acid, and maleic acid; the amide such as such as (meth)acrylamide; N-alkylolamide such as N-methylol(meth)acrylamide and 2-hydroxyethyl(meth)acrylamide; hydroxyalkyl ester of the above-mentioned carboxylic acid, such as hydroxyethyl (meth)acrylate and hydroxypropyl (meth)acrylate; amino-functional monomers such as N,N-Dimethylaminoethyl methacrylate; ureido-functional monomers such as methacrylamidoethyl-2-imidazolidinone; or monomers bearing acetoacetate-functional groups such as acetoacetoxyethyl methacrylate.

At least one of the first and the second mixtures of monomers may further comprise from 0.1% to 5%, and preferably from 0.5% to 3% by dry weight based on total dry weight of the monomers, of a surfactant. One or more anionic or nonionic surfactants or any combination thereof may be used. Suitable examples of the surfactants are given in McCutcheon's Detergents and Emulsifiers (MC Publishing Co., Glen Rock, N.J.) published annually, and include alkali metal or ammonium salts of alkyl, aryl, or alkylaryl sulfates; sulfonates or phosphates; alkyl sulfonic acids; sulfosuccinate salts; fatty acids; ethylenically unsaturated surfactant monomers; and ethoxylated alcohols or phenols.

The polymerization of the first and the second mixtures of monomers is emulsion polymerization, mini-emulsion polymerization or any other methods well-known in the coating industry.

The term "total monomers" means the total amount of the first and the second mixtures of monomers.

The De-Ionized Acidic Colloidal Silica Particles

The de-ionized acidic colloidal silica particles are prepared by de-ionizing raw material colloidal silica particles to remove the metal ions of the raw material colloidal silica particles to less than 500 ppm, and preferably less than 200 ppm. Metal ions are replaced by $H^+$ ions to achieve a pH range of from 2 to 5.5, preferably from 2 to 4, and more preferably from 2.5 to 3. Methods of removing the metal ions are well known and include ion exchange with a suitable ion exchange resin (U.S. Pat. Nos. 2,577,484 and 2,577,485), dialysis (U.S. Pat. No. 2,773,028) and electro-dialysis (U.S. Pat. No. 3,969,266).

The de-ionized acidic colloidal silica particles of the present invention may be prepared from the raw material colloidal silica particles selected from precipitated silica, micro silica (silica fume), pyrogenic silica (fumed silica) or silica gels, and any combination thereof.

Suitable examples of the de-ionized acidic colloidal silica particles include BINDZIL™ 2034D1 commercially available from AkzoNobel Company, and LUDOX™ TMA commercially available from Sigma-Aldrich Co. LLC.

The de-ionized acidic colloidal silica particles may have an average particle diameter ranging from 2 nm to 150 nm, preferably from 3 nm to 50 nm, and most preferably from 5 nm to 40 nm. Furthermore, the colloidal silica particles may have a specific surface area from $20m^2/g$ to $1500m^2/g$, preferably from $50m^2/g$ to $900m^2/g$, and most preferably from $70m^2/g$ to $600m^2/g$.

The Polymer Dispersion

The polymer dispersion of the present invention comprises composite polymer particles having an average particle diameter of from 10 nm to 1000 nm, preferably from 50 nm to 500 nm, and more preferably from 100 nm to 250 nm. The average particle size of the composite polymer particles is determined by the method of quasielastic light scattering according to DIN ISO 13321:2004-10.

The Coating Composition

The polymer dispersion of the present invention is preferably formulated into a coating composition along with coating formulation materials including thickeners and any of a number of ancillary materials including extenders; pigment particles, including encapsulated or partially encapsulated pigment particles and opaque pigment particles; dispersants; surfactants; defoamers; preservatives; flow agents; leveling agents; and neutralizing agents.

The formulation materials of the coating composition can be combined in any conventional order of addition. The polymer dispersion is advantageously contacted first with the pigment particles under shear to form a polymer/pigment composite. The polymer/pigment composite is then formulated into a coating composition along with other coating formulation materials described above:

EXAMPLES

I. Raw Materials

| A) Monomers | |
|---|---|
| Abbreviation | Chemicals |
| BA | butyl acrylate |
| 2-EHA | 2-ethylhexyl acrylate |

-continued

| A) Monomers | |
|---|---|
| Abbreviation | Chemicals |
| MMA | methyl methacrylate |
| (M)AA | (meth)acrylic acid |
| APS | ammonium persulfate |
| DBS | sodium dodecyl benzene sulfonate |
| AMP | 2-methyl-2-amino-propanol |

| B) Starting materials used in coating formulation | |
|---|---|
| Material | Supplier |
| BYK ™ 022 defoamer | Evonik Industries AG |
| Propylene glycol | Sinopharm Chemical Reagent Co., Ltd. |
| AMP-95 neutralizer | The Dow Chemical Company |
| OROTAN ™ 731A dispersant | The Dow Chemical Company |
| TRITON ™ CF-10 wetting agent | Union Carbide Corporation |
| ACRYSOL ™ TT-935 thickener | The Dow Chemical Company |
| ACRYSOL ™ RM-2020 NPR thickener | The Dow Chemical Company |
| TRITON ™ X-405 surfactant | Union Carbide Corporation |
| BINDZIL ™ 2040 colloidal silica | Eka Chemical |
| BINDZIL ™ 2034DI colloidal silica | Eka Chemical |
| TI-PURE ™ R-706 pigment | E. I. du Pont de Nemours and Company |
| KATHON ™ LXE biocide | The Dow Chemical Company |
| ROCIMA ™ 363 biocide | The Dow Chemical Company |
| TEXANOL ™ coalescent | Eastman Chemical Company |

II. Test Procedures

1. In-Process Stability

In-process stability is the stability of polymer dispersions during their preparations by emulsion polymerization and is detected by naked eye observation. "Clean" means the formed gel is less than 1000 ppm by dry weight based on total dry weight of the polymer dispersion, while "gel" means the formed gel is higher than 1000 ppm by dry weight based on total dry weight of the polymer dispersion.

2. Coating Stability (ΔKU)

A Stormer viscometer is used to test the viscosity of a coating composition according to the ASTM (American Society for Testing and Materials) D562 method. After the coating composition is formed, an initial medium shear viscosity, Initial KU, of the coating composition is tested at room temperature, and then the coating composition is balanced at room temperature overnight. Then, the viscosity of the coating composition is measured and recorded as Overnight KU. The coating composition is then placed in an oven at 50° C. for 10 days. The viscosity of the coating composition after storage is tested and recorded as Final KU. The difference between Initial KU and Overnight KU is defined as the viscosity change, ΔKU1. The difference between Initial KU and Final KU is defined as the heat-age viscosity change, ΔKU2. The total ΔKU is the sum of ΔKU1 and ΔKU2. The smaller the total ΔKU value is, the better the viscosity stability is.

III. Experimental Examples

1. Polymer Dispersions (P)

Polymer Dispersion 1 was prepared by following process: A monomer emulsion was prepared by combining 53.6 g BA, 76.25 g 2-EHA, 146.13 g MMA, 5.68 g MAA, 13.5 g 20% DBS solution, and 56.5 g DI water and emulsifying with stirring. 561.8 g (34%) BINDZIL 2034DI colloidal silica and 66.7 g DI water were then charged to a 1-liter multi-neck flask fitted with mechanical stirring. The initial pH value was 2.4. The contents of the flask were heated to 90° C. under a nitrogen atmosphere. 17.6 g (5% of total monomer emulsion) of the monomer emulsion, and 0.85 g APS in 3.6 g DI water were added successively to the stirred flask. The remainder of the monomer emulsion and 0.26 g APS in 15.4 g DI water were added gradually over 90 minutes. Reactor temperature was maintained at 88° C. 5.2 g DI water was used to rinse the emulsion feed line to the reactor. Thereafter, the reaction mixture was stirred at reaction temperature for at least one hour and then cooled to room temperature. The final pH value was adjusted to 9.5 using AMP to form Polymer Dispersion 1. Polymer Dispersion 1 has solids of 44.7% and a particle size of 206 nm.

Polymer Dispersions (P) 2 to 4 and Comparative Polymer Dispersions (CP) 5 to 7

Polymer Dispersion 2 to 4 and Comparative Polymer Dispersions 5 to 7 were prepared according to the procedure of preparing Polymer Dispersion 1. Different amounts of the first mixtures of monomers and the de-ionized acidic colloidal silica were added into the reactor at different initial pHs as listed in Table 2. Either ammonium hydroxide (NH$_4$OH) or hydrogen chloride (HCl) solution was used to adjust the initial pH.

Polymer Dispersion (P) 2 had solids of 46.42% and a particle size of 188 nm.

Polymer dispersion (P) 3 had solids of 39.43% and a particle size of 176 nm.

Polymer dispersion (P) 4 had solids of 45.41% and a particle size of 155 nm.

Polymer dispersion (P) 5 had solids of 42.67% and a particle size of 222 nm.

Comparative Polymer Dispersion (CP) 6 was gelled, but had theoretical solids of 45.5.

Comparative polymer dispersion 7 had solids of 45.28% and a particle size of 162 nm.

Comparative polymer dispersion 8 had solids of 44.95% and a particle size of 183 nm.

2. Coatings

Coatings containing different polymer dispersions were prepared using the following procedure as shown in Table 1. The grind ingredients listed in Table 1 were mixed using a high speed Cowles disperser, and the let-down ingredients listed in Table 1 were added using a conventional lab mixer.

TABLE 1

| Material | Weight (g) |
|---|---|
| "Grind" | |
| Water | 23.08 |
| Propylene glycol | 22.26 |
| KATHON ™ LXE biocide | 0.82 |
| TRITON ™ CF-10 wetting agent | 2.02 |
| BYK ™ 022 defoamer | 0.45 |
| OROTAN ™ 731A dispersant | 6.05 |
| TI-PURE ™ R-706 pigment | 201.76 |
| "Let-down" | |
| Polymer dispersions | 640.00 |
| TEXANOL ™ coalescent | 25.98 |
| TRITON ™ X-405 surfactant | 2.00 |
| ROCIMA ™ 363 biocide | 7.00 |
| Water | 30.00 |
| ACRYSOL ™ RM-2020 NPR thickener | 2.70 |
| ACRYSOL ™ TT-935 thickener | 15.00 |
| AMP-95 neutralizer | 1.00 |
| Total | 980.12 |

IV. Results

TABLE 2

| | Colloidal silica* | The first mixture of monomers | The second mixture of monomers | First/Total | Initial pH | In-process stability | ΔKU |
|---|---|---|---|---|---|---|---|
| P1 | 40% BINDZIL 2034DI | 3% | 57% | 5% | 2.4 | clean | 5 |
| P2 | 40% BINDZIL 2034DI | 18% | 42% | 30% | 2.4 | clean | 8 |
| P3 | 20% BINDZIL 2034DI | 8% | 72% | 10% | 2.4 | clean | 3 |
| P4 | 40% BINDZIL 2034DI | 6% | 54% | 10% | 4.1 | clean | 9 |
| P5 | 60% BINDZIL 2034DI | 4% | 36% | 10% | 2.4 | clean | 6 |
| CP6 | 40% BINDZIL 2040 | 6% | 54% | 10% | 2.5 | gel | —# |
| CP7 | 40% BINDZIL 2034DI | 0 | 60% | — | 2.4 | clean | >40 |
| CP8 | 40% BINDZIL 2034DI | 6% | 54% | 10% | 5.4 | clean | >40 |

*BINDZIL 2034DI is the de-ionized acidic colloidal silica, while BINDZIL 2040 is ordinary colloidal silica.
Comparative Polymer Dispersion 6 (CP6) gelled during its preparation, therefore, was not made into a coating composition for coating stability (ΔKU) test.
% is dry weight percent based on total dry weight of the polymer dispersions, except for First/Total, which means the dry weight percent of the first mixture of monomers based on total amount of the first and the second mixtures of monomers.

Comparative Polymer Dispersion 6 (CP6) comprised ordinary colloidal silica. Polymer Dispersion 4 (P4) compared to Comparative Polymer Dispersion 6 (CP6), had improved in-process stability (from "gel" to "clean"), and detectably acceptable coating stability (ΔKU equals to 9). This indicated the critical role the de-ionized acidic colloidal silica played to the stabilities of the polymer dispersion and therefore the coating composition.

Polymer Dispersion 4 (P4) compared to Comparative Polymer Dispersion 8 (CP8), had different initial pH (from 5.4 to 4.1), therefore, had improved coating stability (ΔKU from >40 to 9). This indicated the critical role the initial pH played to the coating stability.

Comparative Polymer Dispersion 7 (CP7) and Polymer Dispersions 1, 2 and 4 (P1, P2 and P4), have the same amounts of total monomers (60%), while CP7 used the monomers in one batch (without the first mixture of monomers), rather than in two separate batches as used in P1, P2 and P4. P1, P2 or P4 compared to CP7, had improved coating stability ($\Delta KU$ from >40 to 5, 8 or 9). This indicated the critical role the first mixture of monomers played to the coating stability.

Polymer Dispersions 1, 2, 3, 4 and 5 were prepared by using different initial pHs, different total amounts of the first and the second mixtures of monomers, and different amounts of the first mixture of monomers in total monomers as defined by the present invention. All of these examples showed improved and acceptable coating stabilities.

What is claimed is:

1. A coating composition comprising a polymer dispersion, the polymer dispersion comprising, (a) a polymer formed by polymerizing monomers, the amount of the monomers being from 30% to 90% by dry weight based on total dry weight of the polymer dispersion, and (b) de-ionized acidic colloidal silica particles in an amount of from 10% to 70% by dry weight based on total dry weight of the polymer dispersion,
wherein the viscosity stability ($\Delta KU$) of the coating composition as determined by Stormer viscometer according to ASTM D562 method is from 5 to 9.

2. The coating composition of claim 1, wherein the polymer dispersion comprises from 20% to 50% of de-ionized acidic colloidal silica particles.

3. A coating composition comprising a polymer dispersion, wherein the polymer dispersion is prepared by a method comprising
(i) contacting an aqueous dispersion of de-ionized acidic colloidal silica particles with a first mixture of monomers to form a combination, wherein the de-ionized acidic colloidal silica particles are present in an amount of 10% to 70% be dry weight based on total dry weight of the polymer dispersion;
(ii) polymerizing said combination at an initial pH of from 2 to 5 to at least 90% in completion; and
(iii) adding a second mixture of monomers at a rate substantially equal to the rate of consumption of said second mixture of monomers to continue and complete the polymerization, wherein the viscosity stability ($\Delta KU$) of the coating composition as determined by Stormer viscometer according to ASTM D562 method is from 5 to 9.

4. The coating composition of claim 3, wherein a total amount of the first and the second mixtures of monomers is from 30% to 90% by dry weight based on total dry weight of the polymer dispersion.

5. The coating composition of claim 3, wherein the amount of the first mixture of monomers is from 1% to 30% by dry weight based on total dry weight of the first and the second mixtures of monomers.

6. The coating composition of claim 1, wherein the de-ionized acidic colloidal silica particles have an average diameter of from 2 nm to 150 nm.

7. The coating composition of claim 3, wherein at least one of the first and the second mixtures of monomers is selected from acrylic or methacrylic ester monomers, acrylonitrile or methacrylonitrile, styrene or substituted styrene, butadiene, ethylene, propylene, a-olefin, vinyl ester, and any combination thereof.

8. The coating composition of claim 3, at least one of the first and the second mixtures of monomers further comprise from 0.1% to 10% by dry weight based on total dry weight of the monomers, of an ethylenically unsaturated monomer carrying at least one functional group selected from carboxyl, carboxylic anhydride, hydroxyl, amide, amino, ureido, acetoacetate, sulphonate, phosphonate and any combination thereof.

9. The coating composition of claim 3, wherein at least one of the first and the second mixtures of monomers further comprise, from 0.1% to 5% by dry weight based on total dry weight of the monomers, of a surfactant.

10. The coating composition of claim 1, wherein the de-ionized acidic colloidal silica particles are made from precipitated silica, micro silica, pyrogenic silica, or any combination thereof.

11. The coating composition of claim 3, wherein the de-ionized acidic colloidal silica particles have an average diameter of from 2 nm to 150 nm.

12. The coating composition of claim 3, wherein the de-ionized acidic colloidal silica particles are made from precipitated silica, micro silica, pyrogenic silica, or any combination thereof.

13. The coating composition of claim 3, wherein the polymer dispersion comprises from 20% to 50% of de-ionized acidic colloidal silica particles.

14. The coating composition of claim 1 wherein the monomers comprise polymerizable ethylenically unsaturated monomers.

* * * * *